Patented Dec. 5, 1939

2,182,613

UNITED STATES PATENT OFFICE 2,182,613

GRANULAR CALCIUM PHOSPHATE AND MANUFACTURE THEREOF

Augustus H. Fiske, Warren, R. I., assignor to Rumford Chemical Works, Rumford, R. I., a corporation of Rhode Island No Drawing. Application January 17, 1938, Serial No. 185,337

2 Claims. (Cl. 23—109)

The present invention relates to the manufacture of granular phosphate baking preparations. In a patent granted to Dr. Catlin in 1892, No. 474,811, the advantages resulting from the production of the phosphate ingredients of baking preparations in granular form were set forth. Briefly, these are a slower evolution of the leavening gas during mixture with a consequent marked increase in baking efficiency, freer flowing characteristics and better keeping qualities. These advantages are believed to result from the increased size of the interspaces between the active particles and the consequent separation of the active ingredients from each other, only small surface areas of each element being subjected to the action of the other elements.

It is important to obtain a granule which is not friable because if, after the calcium phosphate is prepared free from fine powder, the granules break down, the objective for which the material is made granular and free from fine powder is lost.

In former years, it was the practice to make granular phosphate baking preparations from a phosphate source which was known to contain minute amounts of certain metals or metallic salts. These however are regarded as impurities in the phosphoric acid and are substantially all removed from the present commercial phosphoric acid. It is of course most important that the commercial phosphoric acid be of a high degree of purity if intended for human consumption.

When a substantially pure phosphoric acid, such as is made available commercially today by the electric furnace process, is mixed with lime to made monocalcium phosphate, a dry pulverulent material is produced. A typical analysis of the phosphoric acid referred to above is:

Sp. Gr. 1.6038=54.5° Bé.

| | Percent |
|---|---|
| $SO_3$ 0.25%, equivalent to $CaSO_4$ | 0.43 |
| $P_2O_5$ 55.38%, equivalent to $H_3PO_4$ | 76.45 |
| I and A oxides | 0.09 |
| Water, etc | 23.03 |
| | 100.00 |

When mixed with the calculated amount of lime, according to the method well known to those skilled in the art, we obtain a material of the following average composition:

| | Percent |
|---|---|
| CaO | 21.84 |
| $P_2O_5$ | 56.25 |
| I and A oxides | 0.14 |
| Water, etc | 21.77 |
| | 100.00 |

The customary method of attaining the desired grain size or degree of fineness of the resulting monocalcium phosphate is to bolt it first through a No. 8 silk mesh to remove the larger particles, and later bolt it through a No. 18 silk mesh to remove the very fine or powdered particles.

When the present commercially pure phosphoric acid is mixed with the lime, dried and sifted, there is obtained 95.15% of material finer than the No. 18 silk mesh and only 4.85% of granular material which will not pass through No. 18 silk mesh. For the reasons stated above, in the making of a phosphate baking preparation granular material is greatly preferred to the powdered material. The desirability therefore of obtaining a practical method of securing from the mixture of commercial phosphoric acid and lime a larger percentage of granular monocalcium phosphate will be recognized.

During my research relating to this problem I have found that if I add to the phosphoric acid before the same is mixed with a calculated amount of lime, a phosphoric acid solution of a salt of a metal, such as iron, aluminum, or chromium, forming the oxide $R_2O_3$ where R is the metal, and then mix the lime into the phosphoric acid containing such solution, there is a distinct gain in the percentage of granular material secured. The sulphides of these three metals are soluble in mineral acids and are precipitated from solution by ammonia. All are soluble in phosphoric acid and give a gelatinous precipitate as a phosphate.

While the salts of any of this group of metals give the desired granular condition in the calcium phosphate, I believe that because of the undesirable green color of the chromium salt, the iron and aluminum will preferably be used, particularly for products intended for human consumption.

The following are actual experiments which I have performed. To facilitate the introduction of the metal, I dissolve a calculated amount of the same in the phosphoric acid used in each experiment.

Experiment A illustrates the percentage of granular material obtained without the use of any of the metals dissolved in the acid. Experiment B illustrates the improvement in percentage of granular material when iron is dissolved in the phosphoric acid in calculated amount equivalent to 1¼% iron. Experiment C illustrates the improvement in percentage of granular material when aluminum is dissolved in the phosphoric acid in calculated amount equivalent to 1¼% aluminum. Experiment D illustrates the improvement in percentage of granular material when both the iron and aluminum are dissolved in the phosphoric acid in calculated amounts equivalent to 1¼% of iron and 1¼% of aluminum.

Experiment A

| | Parts by weight |
|---|---|
| Phosphoric acid 85 per cent | 218.75 |
| Water | 62.25 |
| Lime | 62.5 |

No added iron or aluminum.

Experiment B

| | Parts by weight |
|---|---|
| Phosphoric acid 85 per cent | 218.75 |
| Water | 62.25 |
| Iron | 2.73 |
| Lime | 62.5 |

Experiment C

| | Parts by weight |
|---|---|
| Phosphoric acid 85 per cent | 218.75 |
| Water | 62.25 |
| Aluminum | 2.73 |
| Lime | 62.5 |

Experiment D

| | Parts by weight |
|---|---|
| Phosphoric acid 85 per cent | 218.75 |
| Water | 62.25 |
| Iron | 2.73 |
| Aluminum | 2.73 |
| Lime | 62.5 |

After mixing, the product of each experiment was allowed to stand for two weeks to cure, and was then dried at 160° F. in a heated dryer having a circulation of air.

Each product was then sifted upon a No. 8 silk mesh screen and it practically all went through. Then the finer than No. 8 silk was sifted upon a No. 18 silk mesh so that the coarser and finer than No. 18 silk might be determined. The following tabulation gives the results of this series of experiments:

| Experiment | Coarser than No. 8 silk | Between No. 8 and No. 18 | Finer than No. 18 |
|---|---|---|---|
| | | *Percent* | *Percent* |
| A | 0 | 4.84 | 95.15 |
| B | 0 | 52.17 | 47.83 |
| C | 0 | 61.06 | 38.94 |
| D | 0 | 49.50 | 50.49 |

The above results indicate the great improvement that results in the yield of granular material from my discovery that the addition of the salt of the metal yielding the oxide $R_2O_3$ will cause the agglomeration, or crystallization, of the particles of monocalcium phosphate when as little as 1¼% of equivalent metal is dissolved in the phosphoric acid from which the monocalcium phosphate is made.

The following are the amounts of the metal indicated in the finished products:

| | |
|---|---|
| Sample from Experiment A | Trace |
| Sample from Experiment B | 1.14% iron |
| Sample from Experiment C | 1.15% aluminum |
| Sample from Experiment D | 1.15% iron / 1.14% aluminum |

My product is crystalline and dense and therefore not friable, which ensures its successful use in a phosphate baking preparation.

Without wishing to be limited to any theory as to how this desirable result is attained, I point out that since many of the compounds of this class of elemental metals yielding the standard oxide $R_2O_3$ are known to have a gelatinous consistency under certain conditions, it is probable that this property may prevail during the formation of the monocalcium phosphate. Therefore, the otherwise soft, pulverulent monocalcium phosphate is agglutinated together during the process of formation and as the monocalcium phosphate gradually takes form and emerges from the mixture during the process of the combination of the phosphoric acid and lime, at the same time an equivalent of the $R_2O_3$ elemental phosphate is also produced to bind the otherwise pulverulent material into an intimate unital crystalline granule.

What I therefore claim and desire to secure by Letters Patent is:

1. In the method of forming from a commercially pure phosphoric acid which is free of metallic compounds a monocalcium phosphate containing a relatively high percentage of granular non-friable product to soft pulverulent product, the step which consists of reacting a soluble phosphate of a metal of the group consisting of iron, aluminum and chromium with the required amounts of phosphoric acid, lime and water for forming the monocalcium phosphate, said soluble phosphate being present in an amount sufficient to convert a substantial proportion of the otherwise soft pulverulent monocalcium phosphate into a granular non-friable product and to furnish approximately 1¼% of said metal in the final product.

2. In the method of forming from commercially pure phosphoric acid which is free of metallic compounds a monocalcium phosphate containing a relatively high percentage of granular non-friable product to soft pulverulent product, the steps which comprise dissolving in such phosphoric acid a compound of a metal of the class consisting of iron, aluminum and chromium, and reacting such solution with the required amounts of phosphoric acid, lime and water for forming the monocalcium phosphate, said soluble phosphate being present in an amount sufficient to convert a substantial proportion of the otherwise soft pulverulent monocalcium phosphate into a granular non-friable product and to furnish approximately 1¼% of said metal in the final product.

AUGUSTUS H. FISKE.